April 13, 1965    A. C. STARR    3,177,927
AUXILIARY DOOR FOR A BOXCAR
Filed March 18, 1963    4 Sheets-Sheet 1

INVENTOR.
ALBERT C. STARR
BY
Burton & Parker
ATTORNEYS

April 13, 1965   A. C. STARR   3,177,927
AUXILIARY DOOR FOR A BOXCAR
Filed March 18, 1963   4 Sheets-Sheet 2
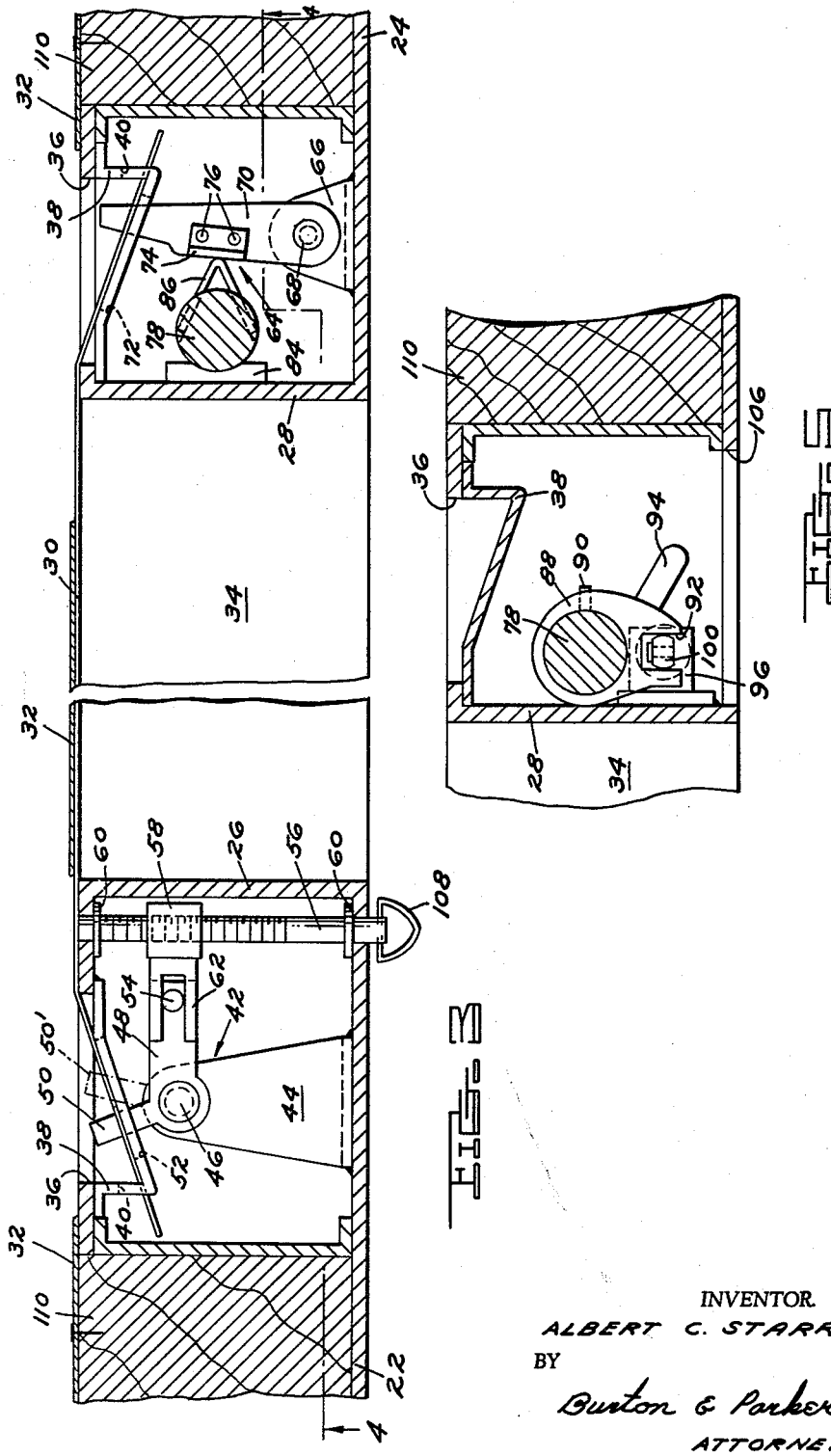
INVENTOR.
ALBERT C. STARR
BY
Burton & Parker
ATTORNEYS

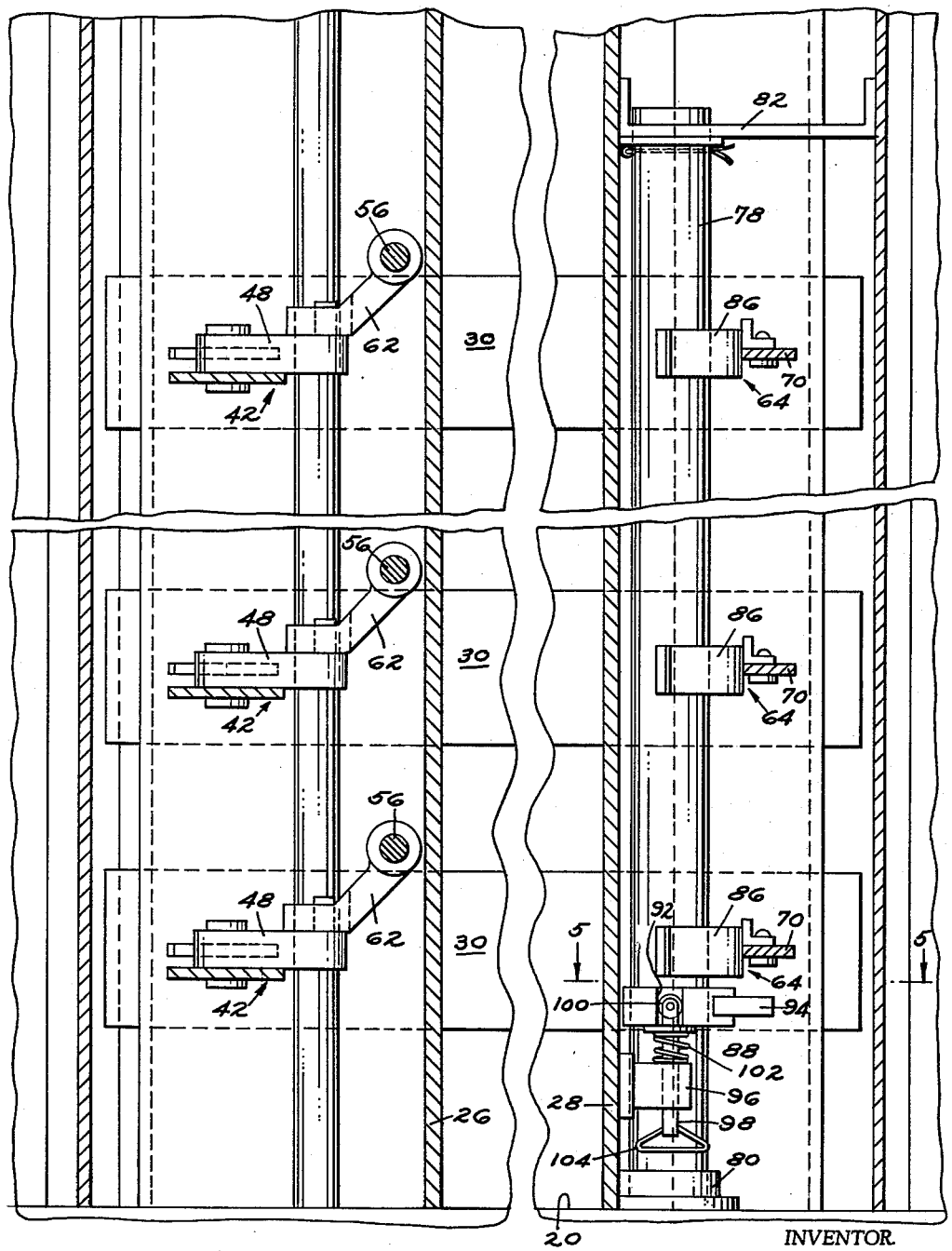

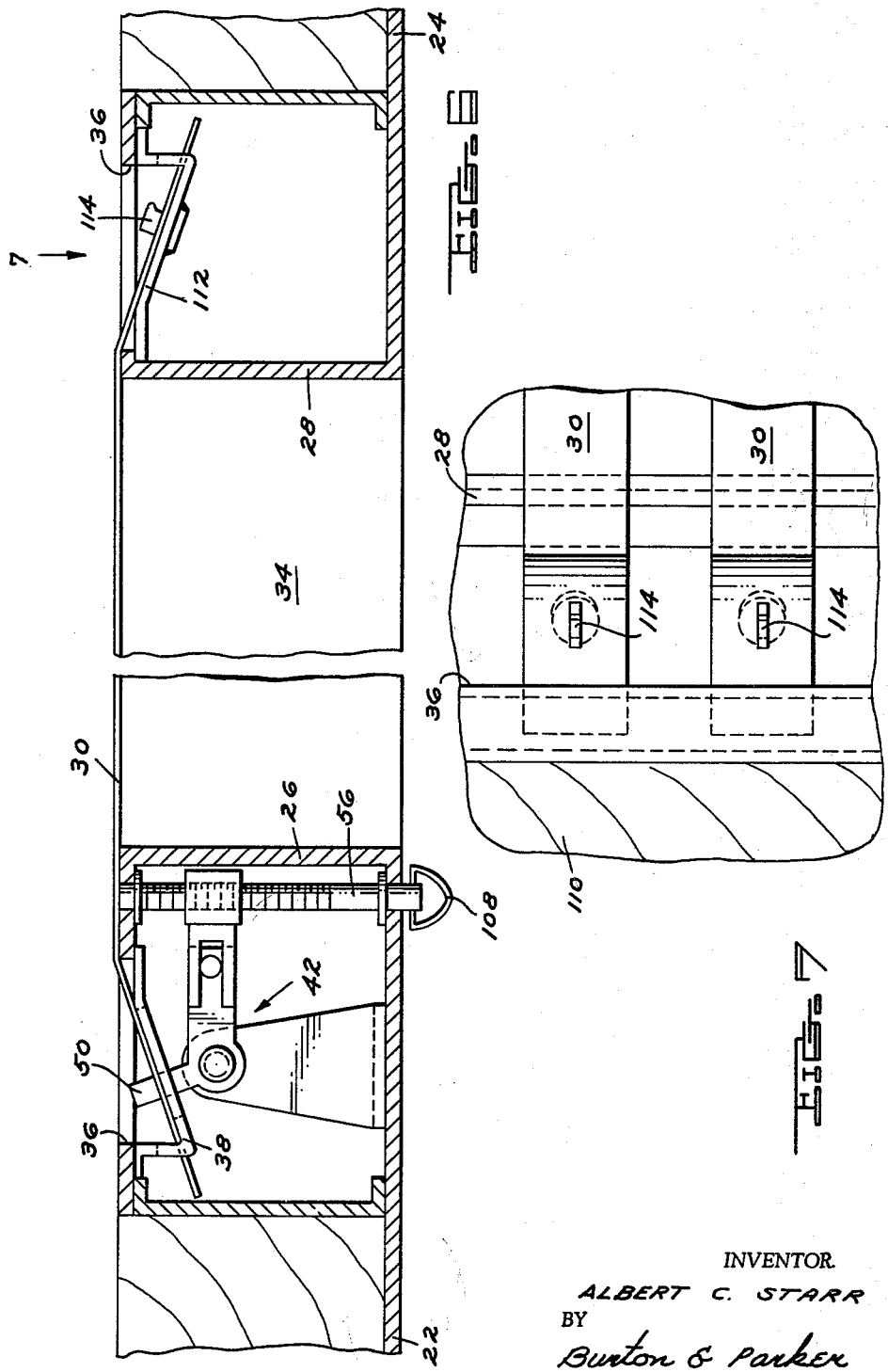

United States Patent Office 3,177,927
Patented Apr. 13, 1965

3,177,927
AUXILIARY DOOR FOR A BOXCAR
Albert C. Starr, 260 N. Main St., Nephi, Utah
Filed Mar. 18, 1963, Ser. No. 265,713
9 Claims. (Cl. 160—328)

This invention relates to an auxiliary door for a boxcar which is supplemental to the standard sliding boxcar door, whereby the car is rendered capable of carrying bulk material such as grain or the like.

An object of the invention is the provision of a door or closure panel which is placed across the side wall door opening of a boxcar supplemental to the sliding door on the outside of the boxcar side wall, which door or panel functions to prevent the escape of granular material such as grain or the like from the car.

Another object is the provision of an auxiliary door which may be easily and economically assembled and installed on the boxcar at the time of use by a single workman with the use of ordinary tools.

A further object is the provision of an auxiliary door which is at least in part expendable, and which comprises a plurality of flexible straps juxtaposed by a frangible closure panel covering the major and lower portion of the side wall door opening of the boxcar, and wherein there is provided mechanical means of fastening and tensioning the straps across the door opening.

A further object is the provision of an auxiliary door of the character described which may be installed on and removed from the boxcar with no danger of damage to the side wall of the boxcar, as happens with expendable doors presently in common use within the railroad industry at the present time.

A meritorious feature of the invention is the provision of mechanism on opposite sides of the side wall door opening of the boxcar within the upright jamb elements of the door frame for fastening and tensioning the flexible straps across the door opening in predetermined spaced-apart relation. This novel mechanism permits a single workman to install the straps on the boxcar with only a simple tool such as a screwdriver or the like, and assures that all the straps will be uniformly tensioned across the door opening.

Another meritorious feature is the provision of a door of the character described wherein the mechanism provided for fastening and tensioning the flexible straps across the door opening is also operable to release one end of the straps when it is desired to unload the grain or other bulk material from the boxcar. As will become apparent as the specification proceeds, the straps may be released individually to provide controlled removal of material from the boxcar, or the straps may all be released simultaneously, whereby the material is allowed to flow freely through the opening.

A further meritorious feature is the provision of an auxiliary door of the character described wherein the flexible straps provided extending across the door opening may be reused over and over again, with the only part of the assembly requiring replacement after each use being the frangible closure panel juxtaposing the straps.

Other objects, advantages and meritorious features will more fully appear from the following specification, claims and appended drawings, wherein:

FIG. 3 is a cross-sectional view partly broken away taken on line 3—3 of FIG. 1;

FIG. 4 is a cross-sectional view partly broken away taken on line 4—4 of FIG. 3;

FIG. 5 is a partial cross-sectional view taken on line 5—5 of FIG. 4;

FIG. 6 is a cross-sectional view partly broken away similar to FIG. 3 showing another embodiment of the door; and, FIG. 7 is a partial elevation taken in the direction of the arrow in FIG. 6.

Excluding my permanent type auxiliary door disclosed in U.S. Patent No. 3,039,525, the prior constructions for rendering railroad boxcars suitable for carrying bulk material such as grain or the like have comprised members nailed to the inside of the freight car and over the major and lower portion of the door opening. One common practice has been to nail flexible metal straps in spaced parallel placement over the door opening, and then to nail a frangible closure panel of heavy paper material or the like across the opening juxtaposing the metal straps interiorly of the straps. Another practice has been to prefabricate the door or closure member consisting of the metal straps and frangible paper panel at the factory, in which case the assembly is merely nailed over the door opening at the time of use.

One serious drawback to such prior constructions is that the wooden door jamb members or sideposts are damaged each time the straps and closure panel are nailed to the posts. Furthermore, as frequently occurs when mechanical rams or the like are used to remove the auxiliary door, the nails holding the door in place are torn from the wooden sideposts, actually destroying the posts. In addition, all of the nails must be removed from the sideposts after the bulk material has been removed from the boxcar, further destroying the posts.

Figure 1:
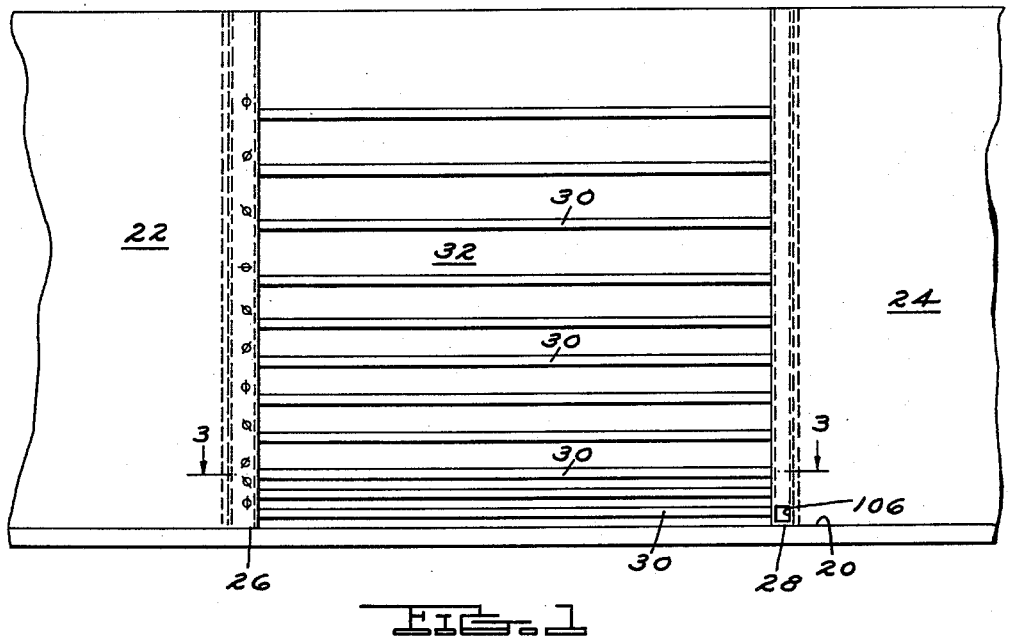
FIG. 1 is a front elevation from the outside of the boxcar of a door embodying my invention.
Figure 2:
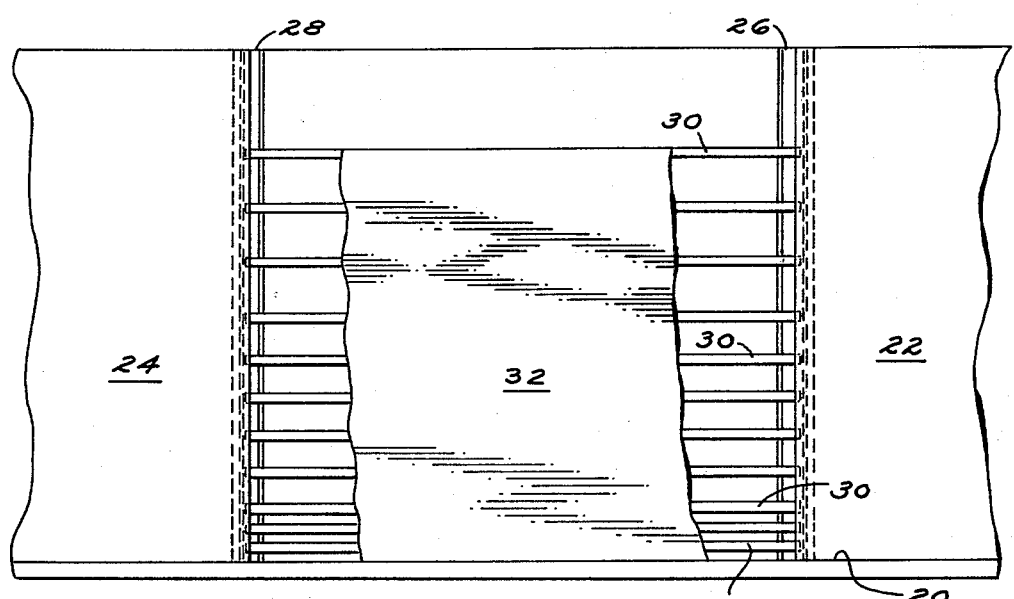
FIG. 2 is a rear elevation from the inside of the boxcar of the door shown in FIG. 1.

Referring now to the drawings, the floorline of a standard freight car is shown at 20 in FIGS. 1 and 2, while the side wall portions on either side of the door opening are shown at 22 and 24 respectively. The outer sliding door which is standard with such freight cars has not been shown, nor has the roof. The opposed upright jamb members 26 and 28 define the side wall door opening across which my auxiliary door extends. The closure member comprises a plurality of elongate flexible straps 30, preferably of metal or the like, extending between the sideposts 26 and 28, and a panel of sheet-like material 32 made out of heavy paper or like material juxtaposing the traps 30 on the inner side thereof.

Many of the bulk materials such as grain which are transported in freight cars are sufficiently heavy so that the cars are only partially filled therewith. The side door closure member therefore only need cover the lower and major portion of the door opening, with the space thereabove permitting ingress and egress of workmen and also allowing loading and/or unloading chutes or apparatus to extend into the car. To prevent damage to the closure panel from such chutes or from workmen entering or leaving the car via the opening above the door, there may be provided a weight supporting element extending between the two jamb members 26 and 28, such as shown in my Patent No. 3,039,525. Such forms no part of the instant invention and has not been shown in the drawings. When the freight car is loaded, the force exerted by the bulk material is greater near the floor of the car and therefore the straps 30 are spaced closer together at the lower end of the door as can be seen from reference to FIGS. 1 and 2.

As previously mentioned, in prior auxiliary door structures, the metal straps are nailed to the wooden sideposts of the boxcar, with resulting damage to the posts. When the posts become damaged in one area from repeated nailings, the workmen assembling the door would nail the straps into an undamaged part of the post, and the spacing between the straps is thus not uniform from door to door. Even more important, it is impossible for the workmen to tension the straps across the door opening, resulting in sag in the closure member when the boxcar is loaded. Sag in the door panel increases the weight supporting requirements, and so a heavier sheet material is necessary when the straps are not tensioned. My door structure eliminates these drawbacks and provides a "no sag" auxiliary door which can be repeatedly assembled in a boxcar without damage to any portion of the car.

Referring to FIG. 3, the threshold of the boxcar door opening is indicated at 34. The opposed upright jamb members 26 and 28 are made out of metal, such as iron or steel, of channel shaped cross section, with the base of the channels defining the marginal edges of the door opening. Each jamb member is apertured as at 36 to accommodate the end portions of strap 30. Aligned with the apertures 36 are brackets 38 welded to the channels and slotted as at 40 to permit the extremity of strap 30 to project therethrough.

Within the jamb member 26 are mounted a plurality of tensioning mechanisms generally indicated at 42 in FIGS. 3 and 4, arranged in vertically spaced-apart relation equal to the desired spacing between the straps 30. Each mechanism includes a horizontal bracket 44 secured as by welding to the channel 26 and provided with a vertical stub shaft 46. Pivotally mounted on shaft 46 is a member 48 having an arm or peg portion 50 projecting through a suitable slot 52 in bracket 38. Projecting from the opposite end of member 48 is a shaft and roller 54. To actuate member 48 in its pivotal movement on shaft 46, there are provided a threaded stud 56 and a complementarily threaded block 58. The opposite ends of stud 56 are journaled in channel member 26 as shown in FIG. 3, and the stud is held against axial movement by two collars 60 secured thereto by any suitable means. Block 58 exhibits a clevis-shaped portion 62 which embraces the roller 54 upstanding from member 48. Thus upon rotation of stud 56, block 58 traverses the stud, and member 48 is pivoted about shaft 46, the purpose for which is described more fully hereinbelow.

Within the opposite jamb member 28 there is positioned strap release mechanism generally indicated at 64 in FIGS. 3 and 4. Such includes a plurality of brackets 66 secured as by welding in identical spaced relation to the brackets 44 in member 26. Each bracket 66 has a vertical stub shaft 68, upon which is pivotally mounted a lever or the like 70, with the free end of the lever projecting through a suitable slot 72 in bracket 38, as shown in FIG. 3. A wear plate 74 may be fastened to the lever 70 as by rivets 76. Extending vertically within jamb member 28 immediately adjacent the base portion thereof is a long shaft 78 rotatably journaled at its lower end in a bearing member 80 and at its upper end in a plate 82 (see FIG. 4). A partial bearing block 84 may be interposed between shaft 78 and member 28 to prevent lateral distortion of the shaft. Adjacent each lever 70 the shaft is provided with a projecting cam 86 which engages the wear plate 76 on each lever when the shaft is in the position of rotation shown in FIGS. 3 and 4.

A releasable locking mechanism for shaft 78 is provided, as shown in FIGS. 4 and 5. Encircling shaft 78 near the lower end thereof is a collar 88, secured rigidly to the shaft as by a set screw 90 or the like. Collar 88 has a vertical slot 92 therein and is provided with a projecting handle 94. Spaced below collar 88 is a support block 96 mounted on jamb member 28 as by welding. Projecting through a suitable aperture in block 96 and upwardly beyond the block is a shaft 98 carrying at the upper end thereof a roller 100 normally positioned within the slot 92 in collar 88. Interposed between a washer-like projection on shaft 98 and block 96 is a coil spring 102 surrounding the shaft and biasing the same upwardly to position the roller 100 in slot 92. A pull ring 104 may be provided depending from shaft 98 for shifting the shaft to disengage roller 100 from its slot 92. The jamb member 28 is apertured as at 106 to provide access to the mechanism from outside the boxcar.

To assemble my auxiliary door over the boxcar side wall door opening, the shaft 78 is first rotated to the position shown in FIG. 3, in which position it is held against rotation by engagement of roller 100 with collar 88. Each strap is provided adjacent its opposite ends with slots to enable the strap to be engaged by the lever arms 50 and 70 respectively. The straps are positioned individually, one end being received over 70 first, then the strap stretched across the door opening, and its opposite end received over arm 50, which is initially in the position indicated in phantom outline at 50' in FIG. 3. The strap 30 is then tensioned to the desired tautness by rotation of the stud 56, which moves the arm 50 counterclockwise to the position shown at 50 in FIG. 3. Stud 56 is preferably provided with a slot at its inner end and may be rotated by a workman inside the boxcar by means of a screwdriver inserted into such slot, or by a workman outside the car by turning the bail-like handle 108 at the outer end of the stud.

Once all the straps have been tensioned across the door opening, the closure panel 32 of sheet-like material is positioned over the opening juxtaposing the straps 30 on the inside thereof, with the bottom of the panel turned inwardly and overlying the boxcar floor. Such panel extends on either side of the door opening beyond the channel jamb members 26 and 28, and is held in place by being tacked to wooden posts 110 on either side of the door. As the weight of bulk material holds the panel 32 in place when the car is loaded, the panel requires only small tacks to hold it in place, and these do very little, if any, damage to the wood posts 110. With the panel extending beyond the apertures 36 in the jamb members, no bulk material is permitted to find its way into the members 26 and 28 to obstruct the operation of the strap-holding mechanisms.

When it is desired to remove the auxiliary door from the boxcar to unload the car, two possibilities are present. The straps 30 may be individually released, or all of the straps may be released simultaneously. In the former method, only a few of the straps may be released and the panel 32 fractured, in which case the rest of the door remains in place, and the bulk material can flow out of the car in controlled fashion. In the latter case, the entire door panel is released, and the material in the car flows out uncontrolled.

For individual release of any given strap 30, the associated stud 56 is turned by means of handle 108 to rotate the arm 50 clockwise to a position where the arm will be disengaged from the slot in the strap. A determined number of straps may be released in this manner to open only a portion of the boxcar doorway for controlled release of bulk material therefrom.

When it is desired to remove the entire auxiliary door and clear the entire doorway of the boxcar, the straps may be all released simultaneously. This might be referred to as "trip release," as distinguished from "controlled release" where the straps are released individually. To accomplish "trip release," the handle 104 (FIG. 4) is pulled downwardly, disengaging roller 100 from slot 92 in collar 88 and thus freeing shaft 78 for rotation. It should be noted that the location of the bearing point between cams 86 and levers 70 must be such that when the shaft is released the shaft will be turned in a counterclockwise direction as shown in FIG. 3 by the force of lever 70 against cam 86. Thus when the shaft 78 is released, the force of the bulk material in the freight car against the straps 30 tends to draw the arms 70 to the left (FIG. 3), and this force is transmitted to the cams 86 to rotate the shaft counterclockwise. As the lever arms 70 rotate to the left, or counterclockwise, they reach a position at which their outer ends become disengaged from the slots in the straps 30, and the weight of grain or the like pushes the paper panel 32 and the straps 30 out through the door opening of the boxcar. Thus the entire door opening may be cleared for exodus of material from the car simply by a downward pull on handle 104.

Shown in FIGS. 6 and 7 is another embodiment of the mechanism for tensioning the straps 30. The mechanism 42 in the left hand channel shaped jamb member 26 is identical to that of FIG. 3 and bears the same reference numerals for like parts. Jamb member 28 is provided with brackets 112 similar to those shown at 38 in FIG. 3, except that each is provided with a rigid lug 114 or the like projecting laterally therefrom, over which the slotted end of strap 30 may be hooked. Lug 114 may be integral with bracket 112, or may be welded thereto, as shown in FIG. 6.

With the structure of FIGS. 6 and 7, one end of each strap is secured over a lug 114 and the opposite end received over an arm 50, which is then moved counter-clockwise to tension the strap as hereinabove described in connection with FIGS. 3, 4 and 5. For individual or "controlled" release of straps 30 preparatory to unloading the car, the procedure is also identical to that described above. However, there is no provision for "trip release" utilizing the FIG. 6 structure, but the panel may be quickly slashed adjacent to the threshold of the door opening and then the straps released individually While the FIGS. 6-7 structure is cheaper in initial cost, it does not present the advantageous "trip release" feature of the structure of FIGS. 3-5. The latter may present a long range cost saving in that the "trip release" may be used without damage to the straps 30, and thus the straps can be used over and over again. Both embodiments serve to tension the straps tautly across the door opening in a predetermined, spaced parallel relation without damage to any portion of the freight car. With the straps thus tensioned over the opening, there is much less sag in the structure under load conditions. As sag produces much greater concentration of forces on the door, its elimination permits the use of thinner, less expensive material for the panel member 32.

I claim:

1. An auxiliary door for a boxcar having a side wall door opening, comprising: a series of lever arms mounted in vertically spaced relation adjacent each opposite upright edge of the door opening to provide horizontally aligned pairs of lever arms, one of each pair on opposite sides of the opening, one arm of each pair of lever arms being individually mounted for independent movement toward and away from the other arm of the pair; a plurality of flexible straps extending across said door opening and having opposite end portions engageable with pairs of said lever arms; means coupled to each independently movable lever arm operable to move such arm away from the other arm of the pair to tension the strap across said door opening and operable to move the arm toward the other arm of the pair to release the strap from engagement with the movable arm; and a closure panel extending across said door opening juxtaposing said straps on the inside for support thereby.

2. An auxiliary door for a boxcar having a side wall door opening comprising, in combination: a plurality of flexible elongate straps extending generally horizontally across said door opening on the inside of the car and having end portions projecting beyond opposite vertical sides of the opening, with said end portions of each strap exhibiting aperture means therethrough; a series of spaced lever arms individually supported on the inside of the boxcar adjacent one vertical edge of the opening each engageable with the apertures in one end portion of each strap; tensioning mechanism coupled with said lever arms operable to shift the arms to a position tensioning the straps across the door opening; strap end retaining means movably supported on the inside of the boxcar adjacent the opposite vertical edge of the opening engageable with the apertures in the remaining end portion of each strap; means coupled with said retaining means selectively operable to releasably lock the retaining means in a position engaging said straps and to release the retaining means for movement to a position disengaging said straps; and a closure panel extending across the opening juxtaposing said straps on the inside for support thereby.

3. An auxiliary door for a boxcar having a side wall door opening, comprising: a series of movable lever arms mounted within said side wall adjacent each opposite marginal edge of the door opening in vertically spaced relation providing horizontally aligned pairs of lever arms; a plurality of flexible elongate straps having apertures adjacent opposite ends thereof extending across and beyond said door opening in spaced relation, with a pair of lever arms engaging the apertures in each strap; individual mechanism coupled to each of the lever arms in one series operable to independently move each arm to a position tensioning its associated strap across the door opening and including means to retain the lever arm in any predetermined position; locking means coupled to the remaining series of lever arms to releasably lock the arms in a predetermined position engaging said straps, said locking means including release mechanism operable to release said lever arms for movement to a position disengaging the arms from said straps; a closure panel extending across said opening juxtaposing said straps on the inside for support thereby and projecting beyond said lever arms on opposite sides of the opening; and means for securing said closure panel to the side wall of the boxcar beyond each series of lever arms on opposite sides of the opening.

4. An auxiliary door for boxcar having a side wall door opening comprising, in combination: a plurality of flexible elongate straps extending in spaced relation generally horizontally across said door opening and having end portions projecting beyond opposite vertical marginal edges of the opening, with said projecting end portions each exhibiting aperture means opening therethrough; a series of vertically spaced lever arms individually supported adjacent one of said vertical marginal edges of the opening and engageable with the apertures in one end portion of said straps, each lever arm being laterally shiftable toward and away from said opening; a separate tensioning mechanism coupled with each lever arm operable to shift its associated arm to a position away from the opening tensioning the strap across the said opening; a series of vertically spaced lever arms supported adjacent the opposite vertical marginal edge of said opening arranged correspondingly to said first mentioned series of lever arms for engagement with the apertures in the remaining end portion of said straps; a single vertically extending member adjacent said second series of lever arms operatively coupled with said arms to retain the latter in strap-engaging position; and means coupled with said vertically extending member operable to shift said member away from said lever arms permitting the lever arms to shift into a strap-releasing position; and a closure panel extending across the opening juxtaposing said straps for support thereby.

5. The invention as defined in claim 4 characterized in that said second series of lever arms comprises rigid arms pivotally supported for movement toward and away from said door opening, and said vertical member includes cam means normally positioned engaging each of said lever arms to retain the lever arms in said strap-engaging position.

6. An auxiliary door for a boxcar having a side wall door opening, comprising: a plurality of elongate flexible straps extending generally horizontally across said door opening in spaced apart relation on the inside of the car and having end portions projecting beyond opposite vertical sides of the opening; a series of stationary strap-retaining lugs mounted in spaced vertical relation adjacent one marginal edge of said door opening and projecting inwardly of the boxcar; a series of individual lever arms supported adjacent the opposite marginal edge of said door opening for independent rotatable movement toward and away from said stationary lugs; separate actuating means coupled with each of said lever arms to rotate the arms and position the same at different desired positions of rotation; each strap having aperture means adjacent each end thereof receivable over a lug and a lever arm respectively to secure the strap for tensioning across said door opening upon movement of said lever arm away from said lug; and a closure panel of frangible material extending across the opening juxtaposing said straps on the inner side thereof for support thereby.

7. An auxiliary door for a box car having a side wall door opening, comprising: a series of stationary lugs arranged in vertically spaced relation adjacent one marginal edge of said door opening; a series of correspondingly spaced individual lever arms adjacent the other marginal edge of said opening mounted for independent movement toward and away from each corresponding lug; a plurality of elongate flexible straps having aperture means adjacent opposite ends thereof releasably received over said lugs and lever arms respectively with the straps extending across the door opening; actuating means coupled to each lever arm selectively operable to move each arm away from its corresponding lug to tension the strap across the door opening and to move the arm toward said lug to release the strap from engagement with the arm; and a frangible closure panel extending across the door opening juxtaposing said straps on the inside for support thereby.

8. An auxiliary door for a boxcar as defined in claim 7 characterized in that said actuating means includes a part extending through the wall of the boxcar having opposite end portions exposed to the inside and outside of the side wall respectively for operating the actuating means from inside or outside of the boxcar.

9. An auxiliary door for a boxcar having a side wall door opening provided with channel-like opposed upright jamb members exhibiting openings therein facing the interior of the boxcar, comprising: a series of stationary lugs mounted in predetermined vertically spaced relation within one of said jamb members adjacent said opening therein; a series of lever arms mounted in predetermined vertically spaced relation within the other jamb member, each lever arm being mounted for independent swingable movement adjacent the opening in said jamb member from a position inclined toward said door opening to a position inclined away from the door opening; a plurality of flexible elongate straps extending across said door opening and projecting therebeyond and having slots adjacent opposite ends thereof releasably received over a stationary lug and a lever arm respectively; individual means coupled to each of said lever arms to shift the same independently away from said opening to tension one of said straps thereacross and toward the opening to release said strap from said lever arm, said means including a member projecting transversely through opposite sides of the side wall of the boxcar having actuating means at both ends thereof for shifting said lever arms from inside or outside of said boxcar; a closure panel of frangible material extending across the door opening interiorly said metal straps and juxtaposing the straps for support thereby; and means for securing said closure panel to the side wall of the boxcar on opposite sides of said door opening beyond said jamb members.

References Cited by the Examiner

UNITED STATES PATENTS

| 207,462 | 8/78 | Valley | 5—223 |
| 2,792,882 | 5/57 | Snyder | 160—368 |
| 3,029,869 | 4/62 | Willoughby | 160—328 |

FOREIGN PATENTS

| 27,218 | 11/06 | Great Britain. |
| 362,133 | 6/06 | France. |

HARRISON R. MOSELEY, *Primary Examiner.*